United States Patent [19]

Alm

[11] Patent Number: 5,618,588

[45] Date of Patent: Apr. 8, 1997

[54] COATING ON MARINE CONSTRUCTIONS

[75] Inventor: Kjell K. Alm, Göteborg, Sweden

[73] Assignee: Sealflock Aktiebolag, Gothenburg, Sweden

[21] Appl. No.: 347,377

[22] PCT Filed: Jun. 7, 1993

[86] PCT No.: PCT/SE93/00504

§ 371 Date: Feb. 28, 1995

§ 102(e) Date: Feb. 28, 1995

[87] PCT Pub. No.: WO93/25432

PCT Pub. Date: Dec. 23, 1993

[30] Foreign Application Priority Data

Jun. 5, 1992 [SE] Sweden ................................. 9201736

[51] Int. Cl.$^6$ ............................. B05D 1/14; B05D 1/04; B63B 59/04
[52] U.S. Cl. ......................... 427/462; 427/200; 427/206; 114/222
[58] Field of Search ................................. 427/462, 200, 427/202, 206, 463; 114/222

[56] References Cited

U.S. PATENT DOCUMENTS 3,554,154  1/1971  Thomas ................................. 114/222
4,923,730  5/1990  Taniguchi et al. ........................ 428/92

FOREIGN PATENT DOCUMENTS 104492  6/1982  Japan ................................. 114/222
6235142  8/1994  Japan .

OTHER PUBLICATIONS

"MoneySense", by R. Saunders, *Daily News*, Section E, p. 1, Feb. 7, 1988.

Primary Examiner—Shrive Beck
Assistant Examiner—Fred J. Parker
Attorney, Agent, or Firm—Birch, Stewart, Kolasch & Birch, LLP

[57] ABSTRACT

A method of preventing overgrowth on surfaces under the water line of vessels and other marine constructions, wherein a fiber flock is applied to at least a portion of the underwater surfaces, said fiber flock being adhered to said surfaces with an adhesive.

5 Claims, No Drawings

COATING ON MARINE CONSTRUCTIONS

BACKGROUND OF THE INVENTION

1. Field of the Invention

The present invention relates to vessel brought forward in a fluid medium meeting a resistance of flow due to friction against the surrounding medium, and other marine constructions which at least partially reach under the surface of water. Especially, the invention relates to coatings below the surface of water for anti-fouling and reducing friction.

2. State of the Art

Vessels of the abovementioned type are floating in or supported by a surrounding medium both when they are stationary and moving forwards. Vessels also encounter a powerful resistance of flow when driven forwards, the resistance increasing with the square of the speed as it increases. The resistance to flow depends mainly on the friction against the surrounding medium and the greatest part of the input energy to the vessel is consumed for overcoming this frictional resistance. In order to reduce this resistance of friction and flow, up to now vessels have been made streamlined and the surfaces facing the medium as even and smooth as possible. One has also tried to paint the surfaces with friction reducing means and used toxic paints for preventing overgrowth and thereby increasing resistance of flow.

TECHNICAL PROBLEM

Tests to reduce the friction between a moving vessel and the surrounding medium have so far only been partly successful. It is true that big improvements in this respect have been made during later decades, but it is still a fact that large amounts of energy in the form of fuel have to be used. This, of course, is a big problem concerning the costs, but at least as big concerning the environment which is polluted by all the exhaust gases.

SUMMARY OF THE INVENTION

The solution

From the above mentioned reasons it has been a longfelt need to be able to reduce overgrowth and the frictional resistance between a vessel in movement and the surrounding medium and according to the present invention I have provided vessels wholly or partially with fiber flock on areas coming in contact with the fluid medium.

It is advisable to provide hulls with fiber flock up to the water line. Submarines, which often are driven totally immersed in water should be provided with flock all over the surface. Because of the lower energy consumption the submarine can stay longer under water and it is more silent due to the noise reduction in the flock layer.

DETAILED DESCRIPTION OF THE INVENTION

The technique for providing fiber flock to a surface is well known. It consists of providing an area with an adhesive whereafter electrically charged fibres are caused to land in the adhesive and are fastened in it. The adhesive often is a two component resin and the fibres usually are synthetic made of polyamide for instance. However, the fibres useful for the present invention are not limited to any special type, also for example coal fibres, glass fibres or similar can be used.

According to a preferred embodiment of the present invention a lot of fibres are used, which after electrostatic application to a great extent will be fixed perpendicular to the base. The density of fibres may be 50–300 fibres per square mm, preferably more than 150 fibres per square mm, with a fibre thickness less than 0.1 mm, preferably less than 0.05 mm and a length of 0,5–5 mm, preferably less than 3 mm.

Known technology

The known technology, which is considered closest to the herein proposed, is shown in EP A2 0 353 095 and JP 57-104 492 (Abstract). These show coatings with a fur surface in order to prevent overgrowth with marine organisms. In the first mentioned publication fur coated sheets are attached on the parts to be protected and the fibres are preferably 10–30 mm in length in order to sway freely in the water. In the other publication a hull under the water line is coated with a fur or plastic mat with hair or plastic fibres arranged in the direction from the bow of the vessel in order to prevent an increase of the resistance of flow.

The present invention differs essentially from what is thus known in that fiber flock with a high density of thin, short fibres are used and that they are applied directly in an adhesive on the areas to be coated. No substantial change in the resistance of flow has been registered, in spite of the directions of the fibres being partially randomized, with most of the fibres directed essentially perpendicular to the base. On the contrary, a low resistance of flow is maintained with the present invention owing to no or insignificant overgrowth. The surface with fiber flock also has a high durability and noise reducing and insulating qualities.

Advantages

As mentioned above, according to the present invention the advantage is achieved that less energy is required for driving a vessel, which means savings in costs and reduced stress on the environment. When boats and other marine constructions are provided with fibre flock on surfaces under the water line, this will prevent growth of algae and other plants and animals on the surfaces (anti-fouling). Therefore coating of surfaces with toxic substances, such as red lead, is no longer necessary to avoid such growth. This further strengthens the environment, promoting effect of the invention.

The invention is not limited to the embodiments mentioned above. It can be varied in different ways within the scope of the claims.

I claim:

1. A method of preventing overgrowth on surfaces under the water line of vessels and other marine constructions, comprising:

applying an adhesive to underwater surfaces thereof, electrostatically applying a fiber flock, comprising synthetic fibers having lengths between 0.5 and 5 mm and no anti-fouling toxic chemicals, to at least a portion of the underwater surfaces, said fiber flock being adhered essentially perpendicular to said surfaces with said adhesive, at a density of 50 to 300 fibers per square mm.

2. The method according to claim 1, wherein said fibers have a length between 0.5 and 3 mm, and a density of 150–300 fibers per square mm.

3. A vessel or other marine construction comprising an anti-fouling fiber flock comprising synthetic fibers having lengths between 0.5 and 5 mm and no anti-fouling toxic chemicals, electrostatically applied to at least a portion of surfaces thereof which are intended to come into contact with water, at a density of 50 to 300 fibers per square mm and wherein said fibers are adhered essentially perpendicular to said surfaces.

4. The vessel or other marine construction according to claim 3, wherein the hull of the vessel or the surfaces of the marine construction below the water line are at least partially covered with said fiber flock.

5. The vessel or marine construction according to claim 4, wherein essentially all surfaces are covered with said fiber flock.

* * * * *